United States Patent Office 3,437,504
Patented Apr. 8, 1969

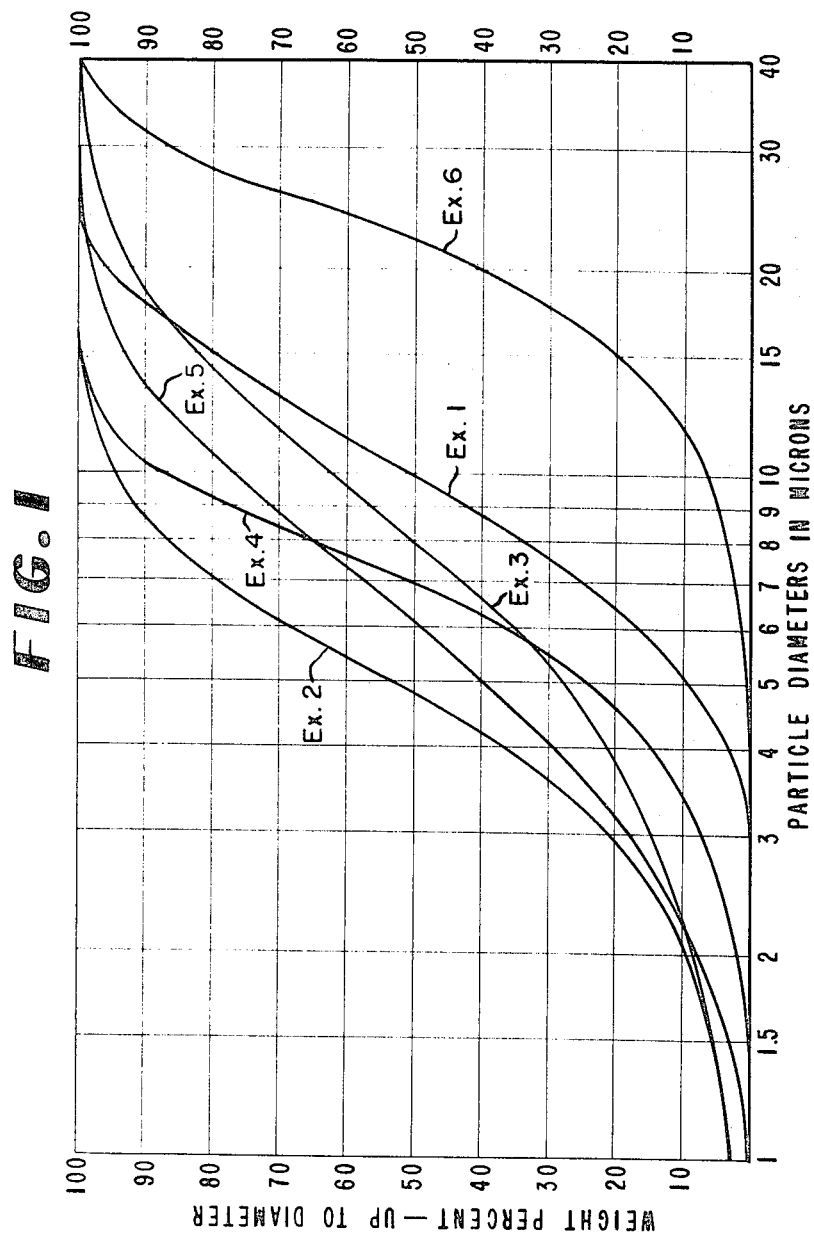

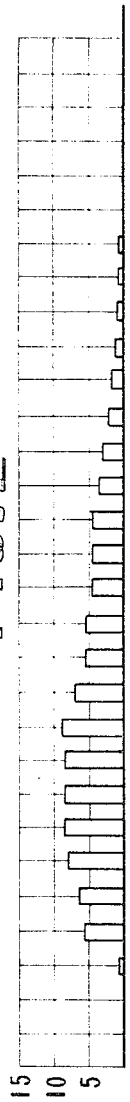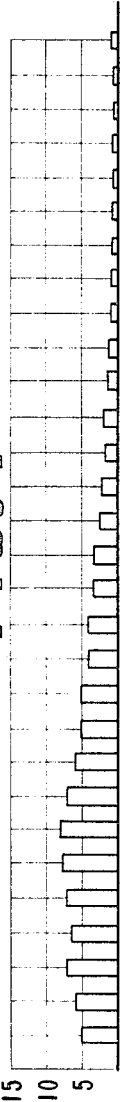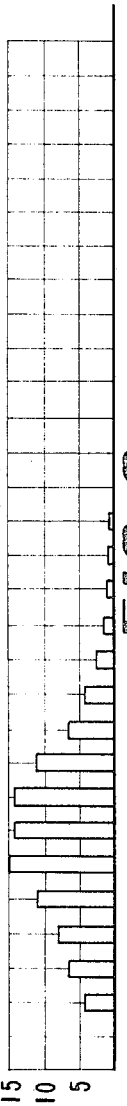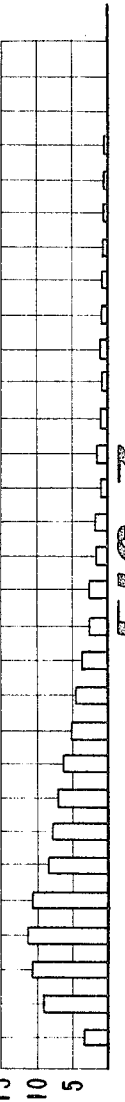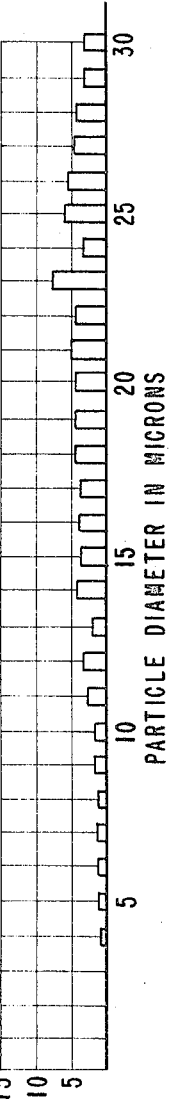

3,437,504
ELECTROSTATIC METHOD FOR DECORATING GLASS AND VITREOUS ENAMELS FOR USE THEREIN
Robert W. Mackey, Wilmington, Del., and William J. Morgan, Toledo, Ohio; Maxine L. Morgan, executrix of said William J. Morgan, deceased, assignors, by mesne assignments, to Owens-Illinois, Incorporated, Toledo, Ohio, a corporation of Ohio
Filed Apr. 27, 1964, Ser. No. 363,021
Int. Cl. B44d 1/094; C03c 17/04
U.S. Cl. 117—17.5                                5 Claims

ABSTRACT OF THE DISCLOSURE

A particulate vitreous enamel, suitable for use in electrostatic methods for decorating hot glass. The enamel consists of enamel particles composed of glass frit particles having dispersed therein pigment particles of average particles size not exceeding 1 micron, which enamel particles have a particle size distribution, on a weight basis, such that not more than 1% of the particles are of sizes up to 1 micron, less than 8% are of sizes up to 2 microns, from 10% to 80% are of sizes from 3 to 10 microns, at least 55% are of sizes from 5 to 20 microns, not more than 10% are of sizes greater than 30 microns, not more than 5% are of sizes greater than 35 microns, and 100% of the particles are of sizes less than 45 microns. Such enamels are usable in electrostatic decorating methods wherein the enamel powder is transferred in an electric field from one electrically charged surface to another electrically charged surface, e.g., from an electrically charged off-set plate to an electrically charged hot glass surface.

---

The term "vitreous enamel" and "enamel" are used herein to mean an enamel in particulate form consisting essentially of a glass frit and an inorganic heat resistant pigment. When such an enamel is applied to glass, e.g., in the form of a design, and caused to be fused thereon by firing, a permanent decoration on the glass results. Vitreous enamels are well known and are sold by manufactures thereof.

In decorating glass with enamels the enamel has most generally been applied to the glass as a suspension in a liquid vehicle such as alcohol, water, pine oil, lavender oil, wax, resin-wax or the like. In the case of glass bottles formed in a glass forming mold, the hot bottles from the mold are cooled in an annealing lehr so as to permit application of the enamel-vehicle composition without setting-up undue strains in the bottles. The composition is dried, then fired on the bottle, after which the hot decorated bottle must again be cooled in an annealing lehr.

It has been proposed to apply vitreous enamels in dry powder form to glass by electrostatic methods in which an electrostatic field established between two oppositely charged electrodes (one of which is the glass object to be decorated) is employed to effect or assist delivery of the enamel particles in the desired design to the glass surface to be decorated. In one such method described in the pending application of William E. Johnson, S.N. 323,409, filed Nov. 13, 1963, the enamel particles are supported as a body of particles on a first electrically conductive surface or plate which is connected in an electric circuit as a first electrode. The article surface on which a decorative image is to be applied (i.e., an offset plate of electrically conductive material or a glass article that is rendered electrically conductive by virtue of its temperature, composition or surface treatment) is placed opposite this first conductive surface and is likewise connected into the electrical circuit as a second electrode. Intermediate the first and second electrodes there is placed a stencil screen containing the desired design of the image. An electrical potential source is then connected into the electric circuit to establish an electric field with a configuration that will electrically attract the particles through the screen image portion and onto the surface that is to be printed. In this example, the potential need be applied only as an electrical pulse of a duration on the order of a millisecond. If the article surface is a hot bottle as it comes from the forming mold, it will be suitably at such a temperature that the enamel particles as they strike the bottle will melt and adhere, forming on the bottle a decoration of the same design as that in the stencil.

In another such electrostatic method, described in the pending application of Kenneth G. Lusher, S.N. 242,229, filed Dec. 4, 1962, now abandoned, the dry enamel is passed through a stencil screen having therein a desired design onto an electrically conducting offset plate so as to form on the plate a powder enamel design which is the mirror image of that desired on the bottle. The offset plate bearing the reverse design is then removed from the stencil screen, and electrically connected as a first electrode into the electrical circuit. The plate is also suitably positioned with respect to the hot bottle, which is connected to the electrical circuit as a second electrode. The enamel design is transferred in the electrical field between the electrodes of the circuit established between the offset plate and the hot bottle. Firing of the enamel on the bottle occurs during the annealing operation as indicated above.

Such electrostatic methods for applying dry powder enamel designs to hot bottles from the forming molds permit the integration of the enamel decorating operations with the machine bottle making operations. Such integration does not require any reheating of the bottle (with subsequent reannealing) to fire the enamel thereon, as is required when practicing the usual decorating methods employing enamel-vehicle decorating compositions. This is a distinct and important practical advantage in favor of such electrostatic decorating methods.

The pigment components of vitreous enamels must be of very small particle size in order to obtain efficient and effective pigmentation of the decoration. The commonly used $TiO_2$ white pigment will generally be of a particle size averaging about 0.2 micron and the spinels used to make blues, blacks, browns and greens are not much larger in average particle size. Even the cadmium sulfide-cadmium selenide pigments used for reds, yellows and oranges are generally below 5 microns in average particle size. As a rule, the average particle size of the commercial pigments will be around 1 micron or less and they will be substantially free of material approaching a particle size of 5 microns. In contrast, the glass frit components of such enamels are employed in substantially coarser form. Thus, they are generally milled in a ball, pebble or similar mill to an average particle size of from 5 to 10 microns, but the milling generally produces a substantial proportion of material much finer than the average and also leaves a substantial fraction of material coarser than the average.

In some instances when rather unstable pigments were to be employed in the usual enamel-vehicle composition, it was considered desirable to protect the pigment from corrosive fumes generated in the firing operation to thereby obtain more intensive coloration. This was done by sintering or fusing suitable dry mixtures of the pigment and frit into a solid cake which was then crushed and milled. The milling was done in the same way that frits are milled and the particle size diestribution of the milled product was essentially the same as that for the usual milled frits. The milled pigment-frit product was then used directly. Because the pigment became embedded in or partly encased by the frit material as a result of the sintering, the pigment was protected to a worthwhile extent from the corrosive fumes during firing.

As indicated above, it is necessary in electrostatic methods that the enamel powder be applied through a stencil screen, either directly onto the glass or first onto an offset plate from which it is then transferred to the glass. It has been found that enamels which are simple dry physical mixtures of the usual commercial pigments and frits are entirely unsituated for one or more reasons for use in such electrostatic decorating methods. This is quite surprising since similar mixtures are entirely satisfactory in methods involving their use as suspensions in the customary vehicles. Such dry physical mixtures, when used in offset electrostatic methods, will not flow through the stencil screen openings even though the particles thereof all be considerably smaller in size than the screen openings; furthermore, they cause serious problems in the transfer of the powder enamel design from the offset plate to the glass.

It is a chief object of the invention to provide improved vitreous enamels which are eminently suitable for use in electrostatic glass decorating methods. A further object is to provide improved composite enamels for such use. A still further object is to provide an electrostatic method for applying such enamels to hot glass. Still further objects will be apparent from the following description.

The objects of the invention are realized by powder enamels, the particles of which are of such sizes as to conform to the particle size distribution pattern defined below, which particles are composite particles consisting of frit particles having dispersed therein pigment particles of suitable size, and by the use of such powder enamels in the electrostatic decoration of glass. The pigment particles of the composite enamels may vary somewhat in particle size distribution from one pigment to another since there will generally be an optimum size for any given pigment, as is well known. However, the pigment particles of the composite enamels will generally be of an average particle size no greater than about 1 micron. Usually, the pigment particles will constitute from about 8 to 12% of the weight of the composite particles.

The powder enamels of the invention characteristically are composed of particles of such sizes that not more than 1% will be of sizes up to 1 micron in diameter, less than 8% will be of sizes up to 2 microns, from 10 to 80% will be of sizes from 3 to 10 microns, at least 55% will be of sizes from 5 to 20 microns, not more than 10% will be of sizes greater thas 30 microns, not more than 5% will be of sizes greater than 35 microns with 100% of the particles being of sizes less than 45 microns, all percentages being by weight based upon the enamel weight.

The above particle size characteristics of the present enamels are critical and essential to their successful use in electrostatic decorating methods. It has been discovered that when the amount of material finer than 1 and 2 microns exceeds the limits stated, the dry enamel powder will not flow through 150 to 325 mesh (U.S. Standard Sieve Scale) stencil screens onto an offset plate pressed against the screen or spaced therefrom a distance up to about 10 mils, even though the screen openings are much larger than the size of the largest particles of the enamel and even when the powder is brushed on the screen with a stiff brush. Furthermore, such unduly fine materials, whether they be of pigment or of frit, tend to adhere so strongly to the offset plate, when using an electrostatic offset decorating method, that their transfer from the plate to the glass requires an impractically great transfer force. On the other hand, enamels with too great proportions of relatively coarse particles tend to "scatter" upon transfer through the screen to an offset plate or directly to the glass with resultant fuzzy images. Furthermore, such coarse particles adhere poorly to the offset plate, and the coarser particles tend to fall off when the plate is moved.

Also surprising was the discovery that the present powder enamels, composed of the composite particles in the above particle size distribution pattern, are not satisfactory for use in the usual decorating methods employing enamel-vehicle compositions. The present enamels do not exhibit the required plasticity and, consequently, tend to separate from the vehicle under the influence of shearing stresses such as are applied when the enamel-vehicle composition is forced through a stencil with the conventional squeegee blade. For suitable use in enamel-vehicle compositions, the enamel must apparently include substantial proportions of very finely divided particles, which proportions are much too large for enamels containing them to be suitable for use in electrostatic decorating methods.

The preferred enamels of the invention are those whose particles are of sizes within the above particle size distribution pattern but have not more than 1% by weight of particles of sizes of up to 3 microns, 30 to 50% of sizes of 3 to 10 microns, at least 70% of sizes of 5 to 20 microns, not more than 10% of sizes greater than 25 microns and less than 1% of sizes greater than 30 microns.

Since the effective use of pigments requires that they be of particle sizes much too fine to permit their use as free particles in electrostatic decorating methods, it might be thought that the problem of using such fine pigment particles could be overcome by binding them to coarser frit particles. However, organic binders when used for this purpose, soften in the presence of hot bottles (300–600° C.) and cause the enamel powders to stick to the offset plate. On the other hand, inorganic binders change adversely the electrical characteristics of the powders and remain as undesired residues in the fired on decorations.

It has now been discovered that satisfactory binding of the fine pigment particles to frit particles to provide composite frit-pigment particles can be readily achieved by mixing the frit and the pigment in the desired proportions to give an intimate mixture of the two, which mixture is then heated to melt the frit and form a dispersion of the pigment in the melted frit. The frit generally should have been ground or milled so as to pass through about a 200 mesh screen (U.S. Standard Sieve Scale). The pigment will of course be quite finely divided as explained above. Commercial pigments in their purchased forms are generally satisfactory since they are usually processed by their manufacturers so as to have optimum particle size for glass decorating purposes. The frit-pigment mixture is heated, e.g., in a clay vessel, preferably coated on the inside with kaolin, at a temperature, for example, of 550 to 750° C. The time and temperature of heating should be controlled so as to effect substantially complete melting of the frit without dissolving of the pigment. The resultant dispersion of the pigment in the melted frit is solidified by cooling before substantial solution of the pigment occurs, the solidified product being a solid dispersion of pigment particles in the solid frit matrix. If temperature-sensitive pigments such as the cadmium selenosulfides are used, the vessel should be covered to exclude air and the resulting dispersion should be solidified by quenching in water immediately following the heating. Water-quenching is desirable also when using stable pigments since such quenching makes the cake more easily crushed; however, air quenching can also be used.

The frit-pigment cake, after being crushed, e.g., in a jaw crusher, so as to pass through a 10 mesh screen is milled, e.g., in a ball or pebble mill or other equivalent device, so as to pass through a 200 mesh screen. Although the milled enamel at this point will consist of composite frit-pigment particles, it will nevertheless be unsatisfactory for use in electrostatic decorating methods because it will contain much too great a proportion of undesirably fine particles and its over-all particle size distribution will be quite different from that found to be necessary. In order to convert the material at this stage into an enamel of the invention, it must be size-classified so as to separate a fraction therefrom which meets the particle size requirements of the invention. Size classification can be readily effected using well known techniques such as sedimentation from aqueous slurries and centrifugal classification in a counter-current stream of air.

The frit employed in making the present enamels may be of a wide variety of glass compositions. The lower melting glasses are generally advantageous over high melting glasses. The preferred frits are relatively low melting lead borosilicate glasses composed of, for example, 10 to 55% PbO, 3 to 7% $B_2O_3$, 20 to 32% $SiO_2$, 0 to 5% $TiO_2$, 0 to 5% ZnO, 0 to 15% $PbF_2$, 0 to 6% $ZrO_2$ and 4 to 14% $Na_2O$, since they usually melt the instant they strike the hot glass and remain fixed thereon.

The invention is illustrated by the following examples. In the examples and elsewhere in the specification and drawings, all particle size values represent measurements with the "Micromerograph" air sedimentation balance described on pages 49–50 of the August 1962 issue of Ceramic Age. The particle diameters indicated are those of spheres having falling times equal to those of the particles. Micromerograph data are customarily presented in the form of curves which are plots of cumulative weight percentages of particle size fractions against particle diameters in microns. Such curves are shown in FIG. 1 of the accompanying drawings for the enamels of Examples 1 through 6.

FIGS. 2 through 7 indicate the particle size distributions for enamels of Examples 1 through 6, respectively, in histogram form with the height of each bar being proportional to the weight percent (based on enamel weight) of a one-micron wide fraction surrounding the indicated diameter. Thus, the height of the bar for a 10-micron fraction is proportional to the weight percent of the enamel particles of a size between 9.5 and 10.5 microns. The data represented by the histograms of the drawings are tabulated in Table 1 and were calculated from the curves of FIG. 1. The histograms indicate the particle size distribution profiles of the enamels of Examples 1 through 6.

Example 1

A lead borosilicate frit of a composition approximating that of the frit of column 3 of Hoffman U.S. Patent 3,084,129 was intimately mixed with a commercial titanium white pigment of 0.25 micron average particle size. The mixture, which contained about 10% by weight of the pigment, was heated at 700° C. for 20 minutes to form a dispersion of the pigment particles in the molten frit, which dispersion was quenched in water. The resulting cake was crushed, ball milled for 5.3 hours, screened through a 200-mesh sieve, then classified in a Sharples K-8 Super Classifier, a commercial centrifugal classifier employing a counter current air stream. There was thereby seperated a product fraction having the particle size distribution indicated in Table I and FIG. 2 of the drawing. The particle size distribution pattern of the product met the preferred particle size requirements of the invention. The enamel product performed exceptionally well in all electrostatic offset decorating tests.

Example 2

An enamel powder product was prepared essentially by the method of Example 1. Its particle size distribution is indicated in Table I and FIG. 3 of the drawing. This enamel product contained an excessive proportion of material finer than 3 microns and a deficiency of material in the 5 to 20 micron range. It could not be made to pass through a 165 mesh screen onto an offset plate either by an electrostatic force or by the use of a stiff brush.

Example 3

An enamel powder was prepared essentially as described in Example 1 except that the milled composite enamel particles were water classified. The enamel powder product had the particle size distribution indicated in Table I and FIG. 4 of the drawing. It contained an excessive amount of material finer than 1 micron and a deficiency of material in the 5 to 20 micron range. It could not be forced through a 165 mesh stencil screen onto an offset plate even by brushing.

Example 4

An enamel was prepared essentially as described in Example 1 to give an enamel powder product having the particle size distribution indicated in Table I and FIG. 5 of the drawing. This enamel had a particle size distribution within the broader limits of the distribution pattern which characterizes the enamels of the invention, but outside the limits for the preferred particle size distribution pattern. This enamel performed very well when brushed through a stencil screen onto an offset plate from whence is was transferred electrostatically to hot bottles. However, it tended to blind the stencil screen when attempting to force it through the stencil screen onto the offset plate by means of a pulsating electrostatic field applied between the stencil screen and the enamel powder bed.

Example 5

An enamel was prepared substantially as described in Example 1 to give a powder enamel product having the particle size distribution indicated in Table I and FIG. 6 of the drawing. This product did not have a particle size distribution characteristic of the preferred products of the invention. Like the product of Example 4, this product performed well when brushed through the stencil screen but tended to blind the screen when it was attempted to force it through electrostatically.

Example 6

An enamel was prepared substantially as described in Example 1 to give a powder enamel product having the particle size distribution indicated in Table I and FIG. 7 of the drawing. This enamel was deficient in material in the 3 to 10 and 5 to 20 micron sizes and had an excess of material in sizes over 30 microns. Although it passed through the stencil screen readily, it lacked sufficient adhesion to the offset plate for it to be retained on the plate during the required subsequent handling of the plate.

Example 7

A lead borosilicate frit, 90 parts by weight, and a commercial finely divided cadmium selenosulfide red pigment, 10 parts by weight, were intimately mixed and the mixture was heated in a covered vessel at 650° C. for 45 minutes to provide a dispersion of the pigment in the molten frit. The dispersion was immediately quenched in cold water, crushed to pass through a 10 mesh screen, and then ball milled for 6.7 hours. The composite enamel was screened through a 200-mesh sieve, then water-classified to give an enamel product having a particle size distribution in accordance with the invention. It performed satisfactorily when used in an electrostatic offset method for decorating hot bottles.

TABLE I.—HISTOGRAM DATA FOR PARTICLE SIZE DISTRIBUTION

| Particle diameter, microns | Percent by weight | | | | | |
|---|---|---|---|---|---|---|
| | Ex. 1 | Ex. 2 | Ex. 3 | Ex. 4 | Ex. 5 | Ex. 6 |
| 1 | 0 | 5.5 | 5.0 | 0 | 3.1 | 0 |
| 2 | 0 | 8.8 | 5.7 | 4.1 | 9.0 | 0 |
| 3 | 0.3 | 14.2 | 7.0 | 6.4 | 10.8 | 0 |
| 4 | 5.5 | 17.0 | 6.3 | 8.0 | 11.2 | 0.5 |
| 5 | 6.4 | 15.5 | 7.2 | 11.0 | 10.5 | 0.7 |
| 6 | 8.0 | 14.0 | 7.8 | 15.0 | 8.4 | 0.9 |
| 7 | 8.6 | 8.8 | 8.0 | 14.1 | 7.8 | 0.9 |
| 8 | 8.5 | 5.7 | 7.0 | 14.2 | 7.0 | 0.8 |
| 9 | 8.7 | 3.8 | 6.0 | 11.3 | 6.2 | 1.2 |
| 10 | 9.0 | 2.2 | 5.0 | 6.4 | 5.0 | 1.5 |
| 11 | 7.0 | 2.0 | 5.0 | 4.2 | 4.5 | 2.5 |
| 12 | 5.5 | 0.8 | 4.0 | 2.6 | 3.5 | 3.0 |
| 13 | 5.5 | 0.7 | 4.0 | 1.2 | 2.5 | 2.0 |
| 14 | 4.5 | 0.2 | 3.0 | 0.9 | 2.4 | 4.0 |
| 15 | 4.5 | 0.3 | 3.0 | 0.4 | 1.6 | 3.2 |
| 16 | 4.5 | 0.3 | 2.5 | 0.2 | 1.5 | 3.8 |
| 17 | 3.5 | 0.2 | 2.0 | 0 | 0.8 | 3.5 |
| 18 | 3.0 | 0 | 1.5 | 0 | 1.1 | 4.5 |
| 19 | 2.2 | 0 | 1.8 | 0 | 0.6 | 4.5 |
| 20 | 1.8 | 0 | 1.3 | 0 | 0.5 | 4.5 |
| 21 | 1.2 | 0 | 1.2 | 0 | 0.6 | 5.0 |
| 22 | 0.8 | 0 | 0.9 | 0 | 0.5 | 4.5 |
| 23 | 0.5 | 0 | 0.8 | 0 | 0.4 | 5.5 |
| 24 | 0.5 | 0 | 0.5 | 0 | 0.2 | 5.0 |
| 25 | 0 | 0 | 0.5 | 0 | 0.1 | 6.0 |
| 26 | 0 | 0 | 0.3 | 0 | 0.1 | 5.5 |
| 27 | 0 | 0 | 0.4 | 0 | 0.1 | 4.5 |
| 28 | 0 | 0 | 0.3 | 0 | 0 | 4.0 |
| 29 | 0 | 0 | 0.2 | 0 | 0 | 3.0 |
| 30 | 0 | 0 | 0.4 | 0 | 0 | 3.0 |
| 30–45 | 0 | 0 | 1.4 | 0 | 0 | 12.0 |
| | 100.0 | 100.0 | 100.0 | 100.0 | 100.0 | 100.0 |

The enamels of the invention are suitable for use in practicing the electrostatic decorating method described in the pending application of Jack E. Morgan application Ser. No. 184,175, filed Apr. 2, 1962, now U.S. Patent 3,238,053. In that method, the enamel powder is projected through an electrostatically charged metal stencil screen onto a spaced oppositely charged glass article to be decorated, which article has a sufficiently high temperature to cause the enamel to fuse thereon, whereupon the glass with the fused enamel thereon is annealed.

The present enamels are especially well suited for use in electrostatic offset decorating methods, particularly in the practice of such methods to decorate hot bottles as they issue from the forming mold in machine bottle making operations. In such offset methods, the enamel powder is passed through a stencil screen having open spaces or perforations therein in the desired design onto an electrically conducting offset plate so as to form on the plate an enamel powder pattern of a design which is the reverse of that desired on the bottle. The enamel powder may be forced through the screen mechanically, e.g., by brushing, or electrostatically. If by the latter method, the screen should be electrically conducting and should be charged electrostatically with a charge, e.g., 3000 to 4000 volts, opposite to that on the offset plate.

The offset plate with the reverse design thereon is then suitably positioned with respect to the hot bottle which is to be decorated. Transfer of the powder enamel design to the bottle is then effected under an electrostatic field created by charging the offset plate with an electrostatic charge, e.g., of 3000 to 4000 volts, opposite to the charge on the hot bottle. If actual contact between the bottle and the design on the offset plate is to be made, the electrostatic field between the bottle and the plate should be sufficiently great to assist transfer of the design to the bottle and assure complete and uniform transfer even to areas of slight nonuniformity in the bottle surface. If transfer is to be made without direct contact of the bottle with the design on the offset plate, the distance between the bottle and the design and the magnitude of the electrostatic field should be correlated so as to effect the desired transfer. Generally, the bottle is rolled in contact with the powder image that is on the offset plate; and, the voltage between the plate and the hot bottle (which is considered at ground) is in the range of from about 2000 to 4000 volts as an adequate voltage for transfer of the image from the plate to the bottle. The voltage should not be so high as to cause arcing.

The embodiments of the invention in which an exclusive property or privilege is claimed are as follows:

1. In an electrostatic method for decorating glass with a vitreous enamel powder wherein said powder is transferred in an electric field from an electrically charged off-set plate to an electrically charged hot glass surface, the improvement comprising employing as said vitreous enamel powder a particulatae vitreous enamel consisting essentially of enamel particles composed of glass frit particles having dispersed therein inorganic heat resistant non-metallic pigment particles of average particle size not exceeding about 1 micron in diameter, said enamel particles having a particle size distribution such that not more than 1% of the particles are of sizes up to 1 micron, less than 8% of the particles are of sizes up to 2 microns, from 10 to 80% of the particles are of sizes varying from 3 to 10 microns, at least 55% of the particles are of sizes varying from 5 to 20 microns, not more than 10% of the particles are of sizes greater than 30 microns, not more than 5% of the particles are of sizes greater than 35 microns, and 100% of the particles are of sizes less than 45 microns; said sizes in microns being the diameters of the particles and said percentages being by weight based upon the weight of the enamel.

2. In an electrostatic method for decorating glass with a vitreous enamel powder wherein said powder is transferred in an electric field from an electrically charged off-set plate onto an electrically charged hot glass, the improvement comprising employing as said vitreous enamel powder a particulate vitreous enamel as defined in claim 1 whose particle size distribution is such that not more than 1% of the particles are of sizes up to 3 microns, from 30 to 50% of the particles are of sizes varying from 3 to 10 microns, at least 70% of the particles are of sizes varying from 5 to 20 microns, not more than 10% of the particles are of sizes greater than 25 microns, and not more than 1% of the particles are of sizes greater than 30 microns.

3. In an electrostatic method for decorating glass with a vitreous enamel powder wherein said powder is transferred in an electric field from an electrically charged surface to an electrically charged surface, the improvement comprising employing as said vitreous enamel powder a particulate vitreous enamel as defined in claim 1.

4. In an electrostatic method for decorating glass with a vitreous enamel powder wherein said powder is transferred electrostatically in the form of an image from an electrically charged member engaging the powder onto an electrically charged hot glass article, the improvement comprising employing as said vitreous powder a particulate vitreous enamel as defined in claim 1 whose particle size distribution is such that not more than 1% of the particles are of sizes up to 3 microns, from 30 to 50% of the particles are of sizes varying from 3 to 10 microns, at least 70% of the particles are of sizes varying from 5 to 20 microns, not more than 10% of the particles are of sizes greater than 25 microns, and not more than 1% of the particles are of sizes greater than 30 microns.

5. In a method for applying a decorative image of a vitreous enamel powder on a surface wherein said powder is transferred in an electric field from its support on a first electrically conductive surface which is connected as a first electrode in an electric circuit to said surface receiving the image which is connected as a second electrode in the electric circuit, the improvement comprising employing as said vitreous enamel powder a particulate vitreous enamel as defined in claim 1.

(References on following page)

References Cited

UNITED STATES PATENTS

| | | | |
|---|---|---|---|
| 2,225,159 | 12/1940 | Deyrup | 106—49 |
| 2,356,317 | 8/1944 | Harbert et al. | 106—49 |
| 2,556,896 | 6/1951 | Beatty | 106—49 |
| 2,662,020 | 12/1953 | Schofield et al. | 106—49 X |
| 2,771,375 | 11/1956 | Foraker | 106—49 |
| 2,844,693 | 7/1958 | Rigterink | 117—70 X |
| 2,992,932 | 7/1961 | Earl | 106—53 X |
| 2,998,320 | 8/1961 | Strimple | 106—49 X |
| 3,055,762 | 9/1962 | Hoffman | 106—53 X |
| 3,058,443 | 10/1962 | Paton | 117—23 X |
| 3,081,698 | 3/1963 | Childress et al. | 117—17.5 X |
| 3,084,129 | 4/1963 | Hoffman | 117—132 X |
| 3,115,415 | 12/1963 | Hoffman | 106—53 X |
| 3,235,332 | 2/1966 | Woodhall | 23—202 |
| 3,253,540 | 5/1966 | Lusher | 101 |
| 3,238,053 | 3/1966 | Morgan | 117—17.5 |
| 3,249,466 | 5/1966 | Lusher | 117—23 X |

WILLIAM D. MARTIN, *Primary Examiner.*

E. J. CABIC, *Assistant Examiner.*

U.S. Cl. X.R.

117—23; 106—49